(12) United States Patent
Wrobel et al.

(10) Patent No.: US 8,536,811 B2
(45) Date of Patent: Sep. 17, 2013

(54) ENGAGEMENT OF A SPINNING AC INDUCTION MOTOR

(75) Inventors: James J. Wrobel, Rockford, IL (US); Gary L. Miles, Stillman Valley, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 468 days.

(21) Appl. No.: 12/909,411

(22) Filed: Oct. 21, 2010

(65) Prior Publication Data
US 2012/0098472 A1 Apr. 26, 2012

(51) Int. Cl.
*H02P 6/04* (2006.01)
*H02P 1/24* (2006.01)
*H02P 1/42* (2006.01)

(52) U.S. Cl.
USPC ...... 318/400.11; 318/727; 318/778; 318/779; 318/806

(58) Field of Classification Search
USPC ............. 318/400.11, 727, 778, 779, 806
See application file for complete search history.

(56) References Cited

U.S. PATENT DOCUMENTS

| 4,451,112 | A | * | 5/1984 | Hattori et al. | 318/778 |
|---|---|---|---|---|---|
| 4,607,205 | A | | 8/1986 | Kito et al. | |
| 4,991,796 | A | | 2/1991 | Peters et al. | |
| 5,122,036 | A | | 6/1992 | Dickes et al. | |
| 5,562,417 | A | | 10/1996 | Grimm et al. | |
| 5,820,074 | A | | 10/1998 | Trommer et al. | |
| 6,145,308 | A | | 11/2000 | Bueche et al. | |
| 6,698,565 | B2 | | 3/2004 | Cool et al. | |
| 6,815,924 | B1 | * | 11/2004 | Iura et al. | 318/727 |
| 7,423,395 | B2 | * | 9/2008 | Iura et al. | 318/400.02 |
| 7,443,130 | B2 | * | 10/2008 | Takao et al. | 318/806 |
| 7,685,824 | B2 | | 3/2010 | Dahm | |
| 2008/0116837 | A1 | | 5/2008 | Kelnhofer et al. | |
| 2010/0126178 | A1 | | 5/2010 | Hyde et al. | |

FOREIGN PATENT DOCUMENTS

| DE | 4107362 | | 9/1992 |
|---|---|---|---|
| EP | 1100191 | | 5/2001 |
| EP | 2197082 | A1 | 6/2010 |
| WO | 0037797 | A1 | 6/2000 |

OTHER PUBLICATIONS

Search Report in European Patent Application No. 11195971.4-2207, dated Sep. 11, 2012.

* cited by examiner

*Primary Examiner* — Erick Glass
(74) *Attorney, Agent, or Firm* — Cantor Colburn LLP

(57) ABSTRACT

A mechanism for a motor controller for engaging a spinning motor is provided. A power section is configured to provide power to the motor. A control is configured to control the power section. The control is configured to search for a motor frequency of the motor by applying a small excitation voltage to the motor, and the excitation voltage is initially applied at a voltage frequency which is a maximum frequency. The control is configured to track the motor frequency until the motor frequency is below an equivalent speed command and engage the motor by applying a higher voltage to the motor.

13 Claims, 12 Drawing Sheets

ENGAGEMENT OF A SPINNING AC INDUCTION MOTOR

BACKGROUND

Exemplary embodiments relate to motors, and more specifically, to control of a spinning motor.

An induction motor or asynchronous motor is a type of alternating current (AC) motor where power is supplied to the rotor by means of electromagnetic induction.

An electric motor turns because of magnetic force exerted between a stationary electromagnet called the stator and a rotating electromagnet called the rotor. Different types of electric motors are distinguished by how electric current is supplied to the moving rotor. In a direct current (DC) motor and a slip-ring AC motor, current is provided to the rotor directly through sliding electrical contacts called commutators and slip rings. In an induction motor, by contrast, the current is induced in the rotor without contacts by the magnetic field of the stator, through electromagnetic induction. An induction motor is sometimes called a rotating transformer because the stator (stationary part) is essentially the primary side of the transformer and the rotor (rotating part) is the secondary side. Unlike the normal transformer which changes the current by using time varying flux, induction motors use rotating magnetic fields to transform the voltage. The current in the primary side creates an electromagnetic field which interacts with the electromagnetic field of the secondary side to produce a resultant torque, thereby transforming the electrical energy into mechanical energy. Induction motors are widely used, especially polyphase induction motors, which are frequently used in industrial drives.

The basic difference between an induction motor and a synchronous AC motor is that in the latter a current is supplied into the rotor (usually DC) which in turn creates a (circular uniform) magnetic field around the rotor. The rotating magnetic field of the stator will impose an electromagnetic torque on the still magnetic field of the rotor causing it to move (about a shaft) and rotation of the rotor is produced. It is called synchronous because at steady state the speed of the rotor is the same as the speed of the rotating magnetic field in the stator.

By way of contrast, the induction motor does not have any direct supply onto the rotor; instead, a secondary current is induced in the rotor. To achieve this, stator windings are arranged around the rotor so that when energized with a polyphase supply they create a rotating magnetic field pattern which sweeps past the rotor. This changing magnetic field pattern induces current in the rotor conductors. These currents interact with the rotating magnetic field created by the stator and in effect cause a rotational motion on the rotor.

However, for these currents to be induced, the speed of the physical rotor must be less than the speed of the rotating magnetic field in the stator or else the magnetic field will not be moving relative to the rotor conductors and no currents will be induced. If by some chance this happens, the rotor typically slows slightly until a current is re-induced and then the rotor continues as before. This difference between the speed of the rotor and speed of the rotating magnetic field in the stator is called slip. It is unitless and is the ratio between the relative speed of the magnetic field as seen by the rotor (the slip speed) to the speed of the rotating stator field. Due to this, an induction motor is sometimes referred to as an asynchronous machine.

BRIEF SUMMARY

According to exemplary embodiments, a motor controller for engaging a spinning motor is provided. A power section is configured to provide power to the motor. A control is configured to control the power section. The control is configured to search for a motor frequency of the motor by applying a small excitation voltage to the motor, and the excitation voltage is initially applied at a voltage frequency which is a maximum frequency. The control is configured to track the motor frequency until the motor frequency is below an equivalent speed command and engage the motor by applying a higher voltage to the motor.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

DETAILED DESCRIPTION

Exemplary embodiments provide a mechanism that is configured to address situations where an induction motor controller (IMC) has to engage and restart an AC induction motor when the AC induction motor is initially spinning freely while unpowered. An example of such an induction motor may be a rapid air movement (RAM) fan, and/or the induction motor may be operatively coupled to the RAM fan such that the induction motor is powered by the turning RAM fan. Also, the induction motor may be referred to as a RAM air fan (RAF).

A motor controller (also referred to as a RAM Fan Motor controller (RFMC)) in exemplary embodiments is configured to engage, e.g., a RAM fan motor, and restart the RAM fan motor when the RAM fan motor is spinning freely while unpowered.

According to exemplary embodiments, the motor controller allows searching, tracking, and engagement of a spinning AC induction motor without the need for a speed sensor (which determines the speed of the induction motor) and/or a position sensor (for determining the position of the induction motor rotor relative to a known position). The motor controller produces a predictable and controllable motor current as feedback from the induction motor during the search process by applying a frequency-dependent excitation (voltage) to the induction motor based on the motor equivalent circuit parameters. The motor controller avoids the possibility of developing regenerative energy in the induction motor by using a negative-going frequency search algorithm, and by employing a Type 1 frequency control loop which has non-zero steady state error and zero overshoot properties.

Figure 1:
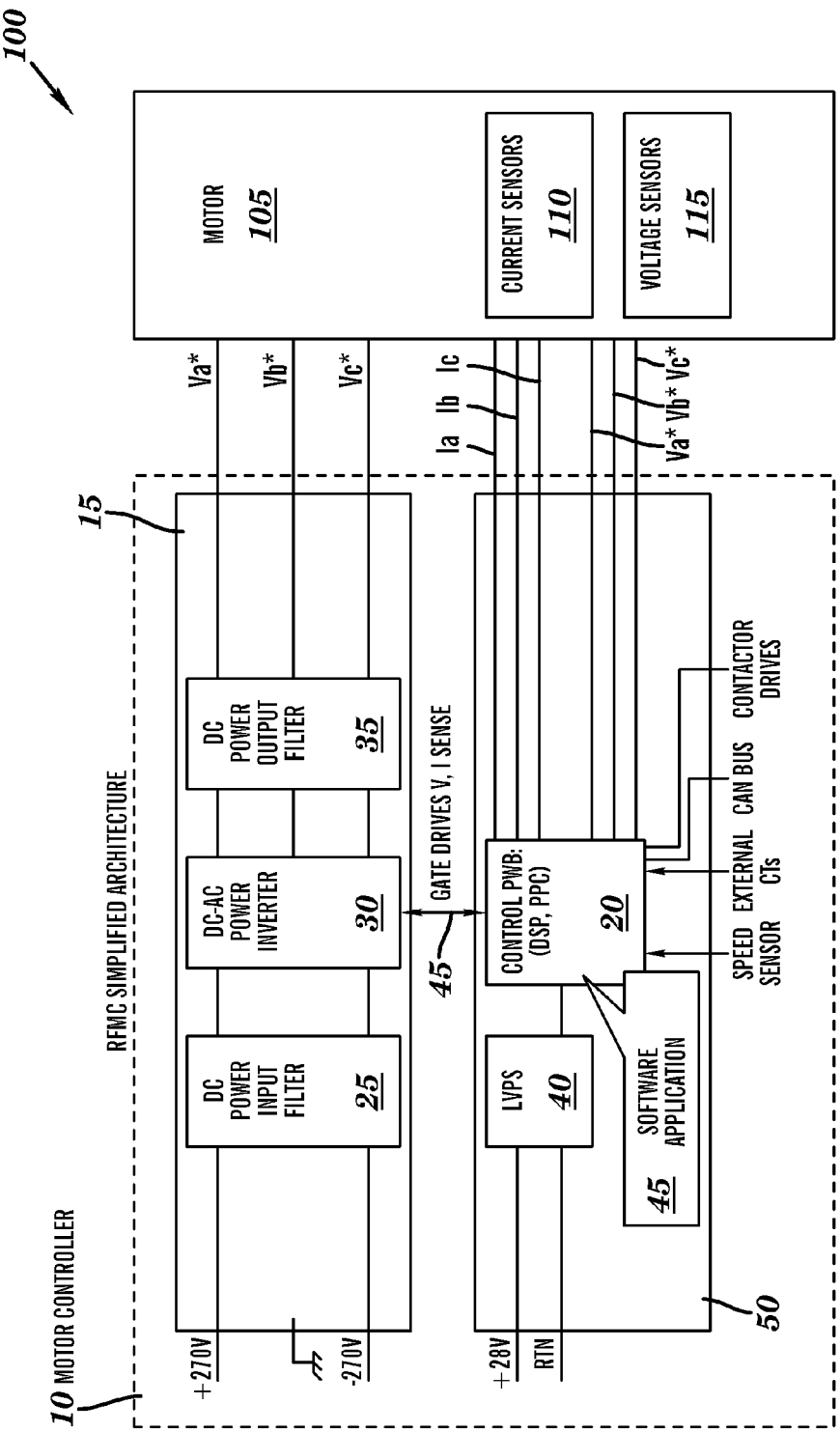
FIG. 1 illustrates a block diagram in accordance with exemplary embodiments.

Now turning to FIG. 1, FIG. 1 illustrates a block diagram 100 in accordance with exemplary embodiments.

The block diagram 100 includes a motor controller 10, which is called a RAM Fan Motor Controller (RFMC). The RFMC 10 may contain a high voltage (270) DC (HVDC) section 15 with a DC-AC power inverter 30 to feed a motor 105 (e.g., an induction motor such as a ram fan induction motor). A DC power filter 25 receives +270 volts DC and −270 volts DC and filters the DC power, e.g., so that the +270 volts and −270 volts are cleaner with no spurious AC voltage components. The DC-AC power inverter 30 converts the +270 volts DC and the −270 volts DC received from the DC power filter 25 into AC power. The DC-AC inverter 30 is designed to output 3 phase AC voltage such as Va*, Vb*, Vc* to the induction motor 105 via an AC power output filter 35. The AC power output filter 35 filters the 3 phase AC voltage from the DC-AC power inverter 30 to remove any DC components.

The motor controller 10 may also contain a low voltage (+28V) section 50 with special purpose embedded computers 20 (also called the control or RFMC control) which control the inverter 30 over a link 45 and communicate with the aircraft on the controller area network (CAN) bus. The computer 20 may include one or more software components (referred to as software application 45) that implement the control, which is discussed further herein. The software application 45 of the control 20 can be tangibly embodied in the control 20 as a computer program product in a computer readable storage medium, such as memory, for causing the control 20 to implement a method on one or more processors/processing circuits. The controller area network (CAN or CAN-bus) is a bus standard designed to allow microcontrollers, electronic control units, devices, etc. to communicate with each other within an aircraft (or missile) without requiring a host computer. The CAN bus may utilize a message based protocol for communication. A low voltage power supply (LVPS) 40 is designed to receive, e.g., 28 volts DC and supply the computer 20 with the appropriate DC power.

The induction motor 105 includes the necessary hardware to operate as a motor as understood by one skilled in the art. The motor 105 also includes current sensors 110 and voltage sensors 115 for providing feedback currents and voltages to the control 10 (e.g., a computer having software application 45) as discussed herein.

Figure 2:
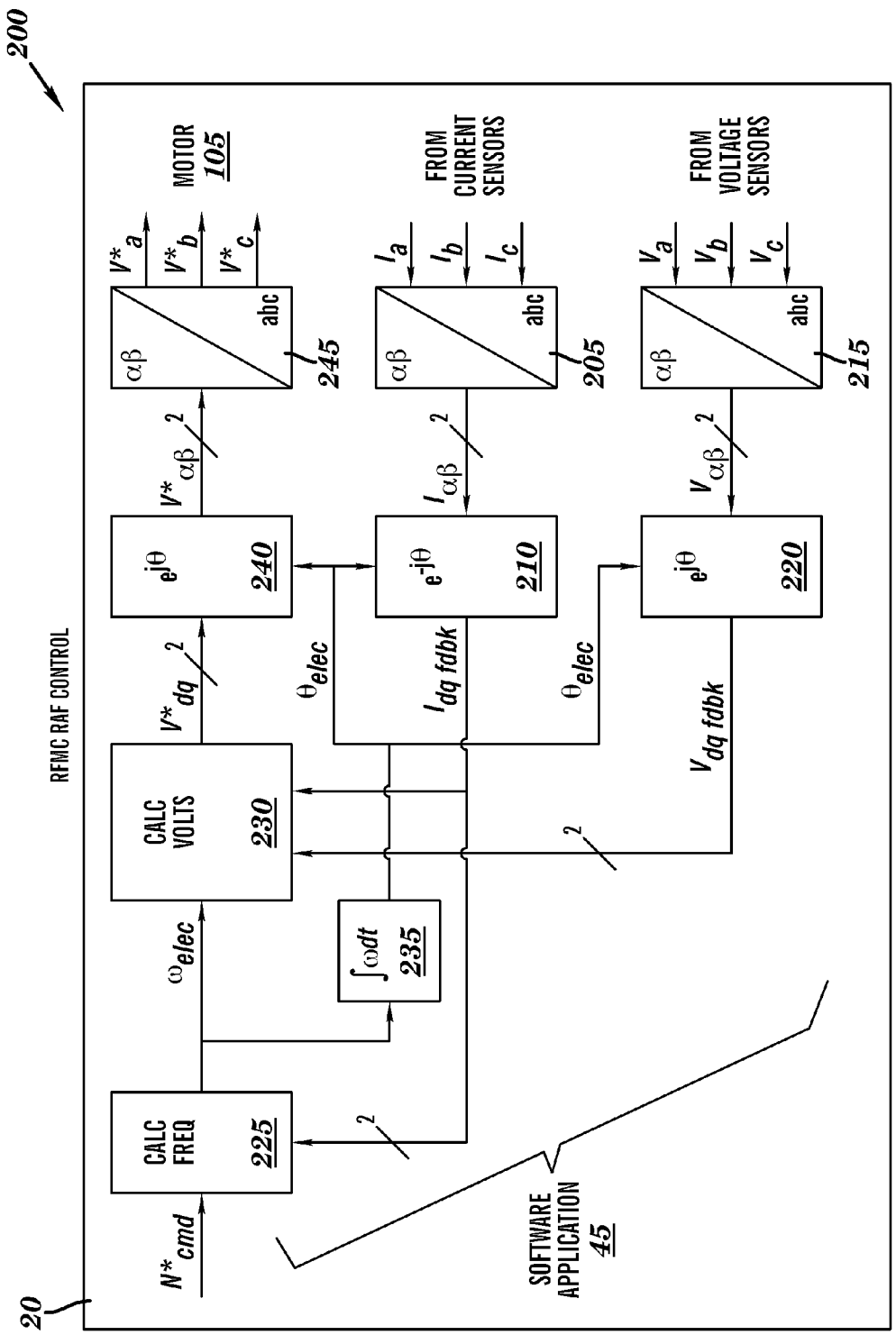
FIG. 2 illustrates a block diagram of a control in accordance with exemplary embodiments.

FIG. 2 illustrates a functional block diagram 200 describing some features the control 20 (also called RFMC radiator fan (RAF) control) which can be a special purpose computer system according to exemplary embodiments. Software applications 45 of the control 20 may control various subsystems. In the present disclosure, the software applications 45 (which may be wholly or partly implemented in application specific integrated circuits and/or field-programmable gate arrays (FPGA)) of the control 20 are configured to operate and control the inverter control functions of the inverter 30. The controller 20 is configured to engage the spinning induction motor 105 according to exemplary embodiments.

In the block diagram 200, the control 20 receives a speed command from the aircraft N*cmd via the CAN bus. In block 225 the speed command is converted to a frequency at which the inverter 30 should run to establish the required stator frequency in the motor 105, and to obtain the commanded speed. However, since the motor 105 is already freely spinning (e.g., at an unknown speed), the control 20 initially applies an excitation voltage Va*, Vb*, Vc* at a maximum frequency w. Block 205 receives feedback (3 phase) currents Ia, Ib, Ic from current sensors 110 of the induction motor 105. The block 205 and block 210 are configured to convert/transform the balanced set of 3 phase feedback currents Ia, Ib, Ic (e.g., sine waves) to a complex vector in a reference frame, where the complex vector rotates at the same frequency as the 3 phase currents Ia, Ib, Ic, thereby eliminating the sinusoidal signals. The block 205 takes the 3 (phase current) sine waves Ia, Ib, Ic that are 120 degrees apart in phase, and reduces the 3 sine waves to 2 (phase current) sine waves I$\alpha$ and I$\beta$, which now represent feedback magnitude and phase. The block 210 removes the rotation of the 2 phase currents I$\alpha$ and I$\beta$, which results in Id and Iq vectors that represent current magnitude and phase of the induction motor 105.

Similarly, the block 215 receives feedback (3 phase) voltages Va, Vb, Vc from voltage sensors 115 of the induction motor 105. The block 215 and block 220 are configured to convert the balanced set of 3 phase voltages Va, Vb, Vc (e.g., sine waves) to a complex vector in a reference frame, where the complex vector rotates at the same frequency as the 3 phase voltages Va, Vb, Vc, thereby eliminating the sinusoidal signals. The block 215 takes the 3 (phase voltage) sine waves Va, Vb, Vc that are 120 degrees apart in phase, and reduces the 3 sine waves to 2 (phase current) sine waves I$\alpha$ and I$\beta$, which now represent magnitude and phase. The block 220 removes the rotation of the 2 phase voltages V$\alpha$ and V$\beta$, which results in Vd and Vq vectors that represent feedback voltage magnitude and phase of the induction motor 105.

According to exemplary embodiments, the control 20 may be referred to as frequency control because the frequency w of the inverter 30 is the primary controlled variable of block 225. From this frequency, block 230 calculates the motor voltage required to produce the rotating magnetic field of the proper magnitude and phase to cause rotational motion (of the induction motor). The resulting voltage is a vector V*dq, which must be converted back to a polyphase system of voltages to be used by the induction motor 105. To accomplish this, the process in blocks 215 and 220 is reversed in blocks 240 and 245, resulting in three phase voltages Va*, Vb*, Vc*. The processes in blocks 205, 210, 215, 220, 225, and 230 require an angle which is used to mathematically rotate or un-rotate the vectors. This angle is produced in block 235 by integrating the stator frequency w determined in block 225. For example, since the induction motor 105 does not have any direct supply onto the rotor, a secondary current is induced in the rotor. To achieve this, stator windings are arranged around the rotor so that when energized with a polyphase supply (via blocks 230, 240, and 245), they create a rotating magnetic field pattern which sweeps past the rotor. This changing magnetic field pattern induces current in the rotor conductors. These currents interact with the rotating magnetic field created by the stator and in effect cause a rotational motion on the rotor.

Figure 3:
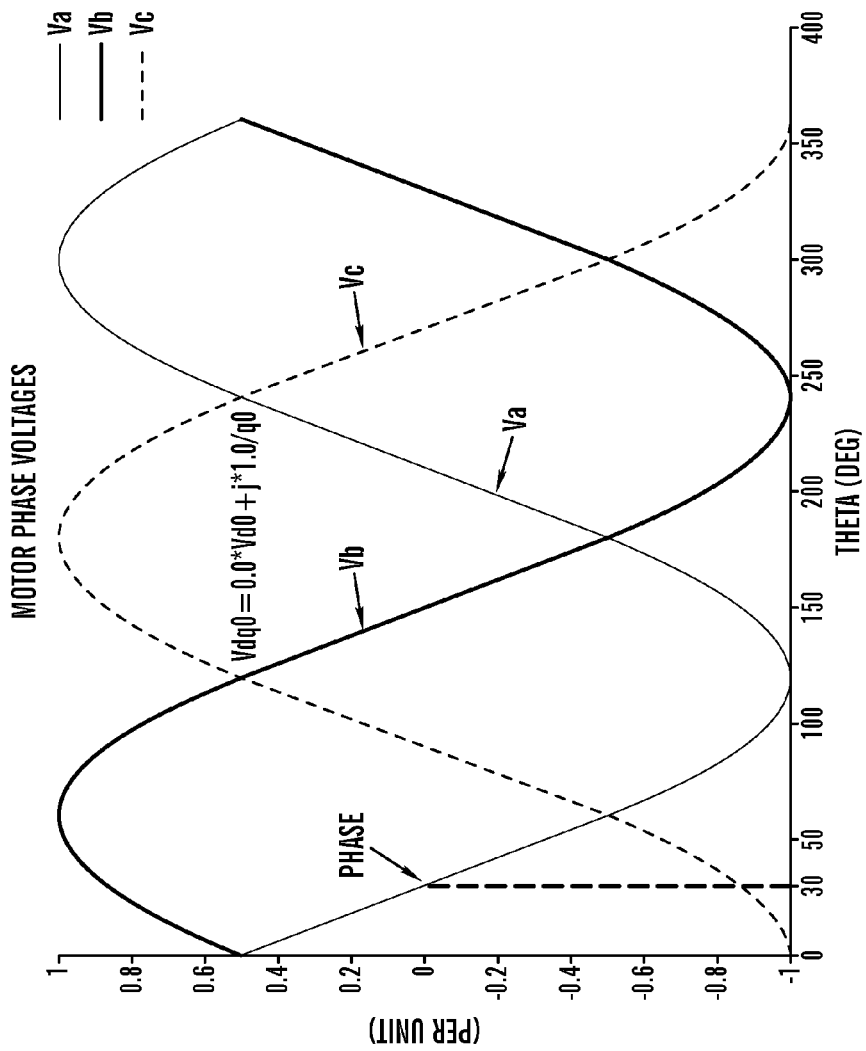
FIG. 3 illustrates a graph in accordance with exemplary embodiments.

Now, turning to FIG. 3, FIG. 3 is a graph illustrating the transformations discussed above in accordance with exemplary embodiments.

The transformation functions, which are blocks 205, 210, 215, and 220 of FIG. 2, computationally convert a balanced set of 3-phase voltages and/or currents (presumably sine waves) to a complex vector in a reference frame which rotates at the same frequency as the 3-phase signals to eliminate the sinusoidal signals. This is done under the premise that a balanced 3-phase signal set has essentially two pieces of information associated with it: the magnitude and the phase. FIG. 3 illustrates this premise with a set of balanced sine waves with an amplitude of 1.0 and phase A offset by 30 deg with respect to the origin. For conciseness, FIG. 3 illustrates feedback voltages Va, Vb, Vc but also applies by analogy for feedback currents Ia, Ib, Ic from the induction motor 105.

Figure 4:
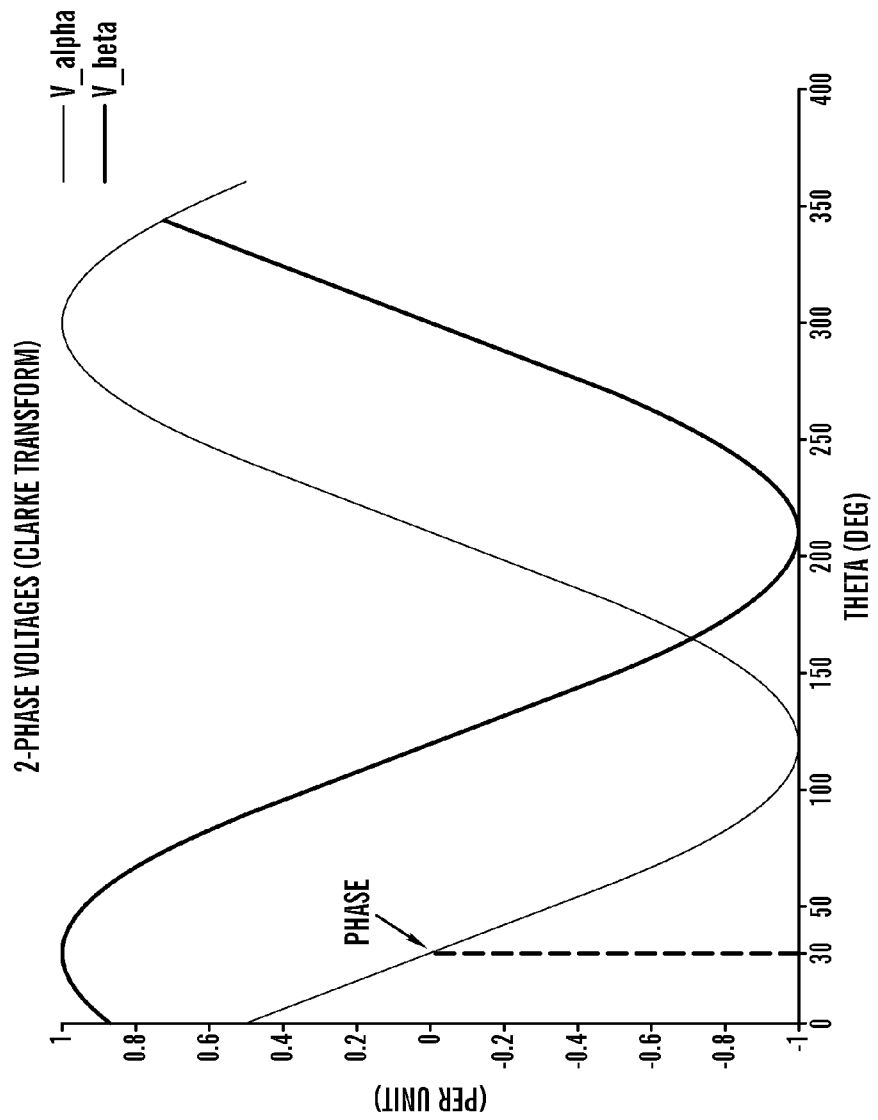
FIG. 4 illustrates a graph in accordance with exemplary embodiments.

With reference to FIG. 4, blocks 205 and 210 of FIG. 2 convert their respective three phase quantities to a two phase system, which still rotates at the same frequency, and displays the same offset angle of 30 deg. This calculation is commonly referred to as the Clarke Transformation. For conciseness, FIG. 4 illustrates rotating 2 phase voltages Vα and Vβ from block 215 of FIG. 2, but applies by analogy to the output of 2 phase currents Iα and Iβ from block 205.

Figure 5:
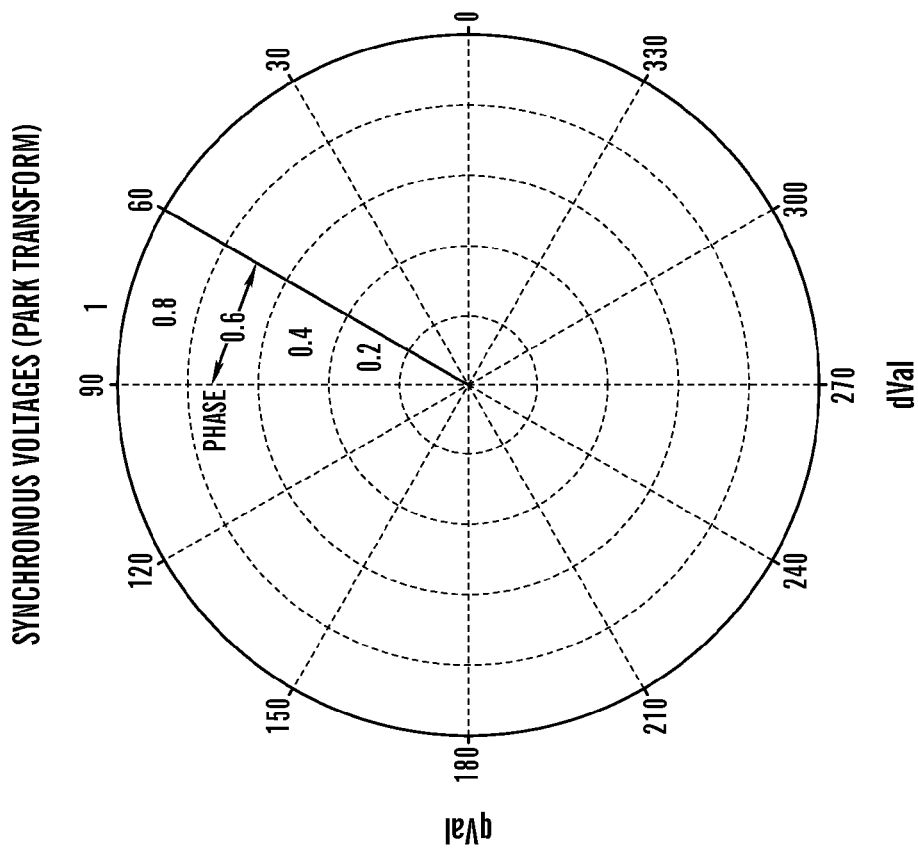
FIG. 5 illustrates a graph in accordance with exemplary embodiments.

With reference to FIG. 5, the blocks 210 and 215 of FIG. 2 respectively multiply their input by a complex unit vector rotating at exactly the same frequency as their respective input. This calculation reduces the input sine waves to a non-rotating complex vector. This calculation is commonly referred to as the Park Transformation. The result is illustrated in FIG. 5 and contains all of the relevant information in the original 3 phase signals, namely the amplitude and phase, but no sine waves. The vector is typically expressed in terms of its real axis (dVal) component and its imaginary axis (qVal) component.

For conciseness, FIG. 5 illustrates vectors (voltages) Vd and Vq from block 220 of FIG. 2 for a dVal (value) and qVal (value), but applies by analogy to Id and Iq for a dVal (value) and qVal (value) from block 210.

These transformations in blocks 205, 210, 215, 220 of FIG. 2 are implemented to simplify the rest of the computations in the motor controller's 10 signal processing computer 20. When the motor controller 10 needs to regenerate a set of balanced three phase voltages Va*, Vb*, Vc* to drive the induction motor 105, the transformation process (in blocks 205, 210, 215, 220) is inverted and reversed by blocks 240 and 245 of FIG. 2, according to exemplary embodiments. Note that this vector (for current and voltage respectively) forms the basis for the discussion where motor voltages and currents are referred to in terms of their d-axis and q-axis component.

With reference to FIG. 2, when the block 225 receives a speed command N*cmd, the induction motor 105 is already spinning (fan), and the induction motor 105 may be decelerating or accelerating. Without using a speed sensor and without using a position sensor, the control 20 via the software application 45 determines/approximates the speed of the spinning induction motor 105 based on the received Iq from the block 210. Initially, the block 225 utilizes a frequency (w in V sine wt) which is much greater than the frequency (spinning of the) induction motor and applies a small voltage Va*, Vb*, Vc* to the induction motor 105. Based on the frequency (w) of the feedback current Ia, Ib, Ic and feedback voltage Va, Vb, Vc from blocks 205, 210 and blocks 215, 220, the control 20 in block 225 calculates the frequency (w) of the spinning induction motor 105 which translates into the speed of the induction motor 105. When feedback current Ia, Ib, Ic and feedback voltage Va, Vb, Vc are received by block 225 and block 230 from the induction motor 105, block 225 continues to lower the frequency (w) of the input voltage Va*, Vb*, Vc* until the frequency (w) of input voltage Va*, Vb*, Vc* matches the feedback frequency (w) which equates to a particular speed of the induction motor. When the feedback current Iq comes back as zero (0) via block 210, the control 20 at block 225 knows that it has output the correct frequency (w) of Va*, Vb*, Vc* that matches the induction motor frequency 105, and this frequency correlates to a predetermined speed (revolutions per second/minute (rpm)) of the induction motor 105. The control 20 continues to lower the frequency of Va*, Vb*, Vc* until the frequency (w) of Va*, Vb*, Vc* is slightly lower then the feedback frequency (w) in feedback current Ia, Ib, Ic from block 210. The control 20 then ramps the frequency (w) of Va*, Vb*, Vc* up to the commanded speed N*cmd as instructed by the aircraft. In exemplary embodiments, the control 20 instructs the DC-AC power inverter 30 to produce the voltage Va*, Vb*, Vc* with the desired frequency (w) in V sine wt as discussed herein, where V is the voltage amplitude of the 3 phase voltage Va*, Vb*, Vc*.

For explanation purposes, section headings are utilized below to ease understanding of exemplary embodiments but the section headings are not meant to be limiting.

The follow are terms utilized in the present disclosure: 1) Current Limit: if the motor current exceeds a limit, suspend the motor frequency ramp, and adjust the stator frequency to control the current. When the current decreases, then try to resume ramping. This process applies for ramping up or down. 2) Voltage Compensation: adjust the motor voltage based on stator frequency. Make minor adjustments to the voltage based on stator current to compensate for motor resistance and feeder resistance drops, so that the magnetizing current is relatively constant with speed and load. 3) Slip Compensation: calculate the motor slip speed based on the measured vector currents, and add the slip speed to the commanded speed, so that the final motor frequency produces a motor speed which is relatively constant with load. 4) Resistance Normalization: normalize the motor resistance value used for voltage compensation with motor frequency, so that motor current peaks and high frequency instability are avoided at very low motor speed. 5) Voltage Regulation: regulate the motor voltage commands using output voltage feedback to minimize voltage errors due to DC link variation and inverter nonlinearity. 6) Spinning Motor Engagement: to engage a spinning motor, apply a reduced voltage to the motor at the maximum output frequency, and scan the frequency downwards while monitoring the motor current for changes which indicate that synchronous speed is being approached. Track the motor until the speed is below the commanded speed, and then engage the motor, and ramp to the command.

1.1 RFMC Control Premise

The Table 1 below provides the RFMC control premise for the motor controller 10.

TABLE 1

RFMC Control Premise

1) The no-load current of the motor at rated speed is defined as the magnetizing current.
2) Rated motor flux can be obtained by setting the motor voltage proportional to the magnetizing current and the magnetizing inductance (V/Hz).
3) Torque is approximately linear with slip speed.
4) Torque is approximately linear with current in excess of magnetizing current, if the two currents are treated as orthogonal vector components in the stator voltage reference frame (similar to Id and Iq in the induction motor (such as a permanent magnet (PM) motor).
Conditions for validity:
a.) Time intervals are large compared to the rotor time constant.
b.) Motor slip is less than rated slip.

1.2 Frequency Ramp

According to exemplary embodiments, the process of accelerating the motor 105 to the desired speed (of the N*cmd command) requires ramping the motor frequency (w) from the present value to the desired value at a predetermined rate by the control 20.

For the ramp process of ramping up the frequency (w) of voltage Va*, Vb*, Vc*, the block 225 converts the speed command (compensated for slip) to frequency (rad/sec). The block 225 of the control 20 ramps from the present frequency to the target frequency at a predetermined rate. If engagement ("catch") mode is active, the block 225 suspends the ramp and resumes the ramp when the mode is exited, starting at the frequency at which the engagement mode left off. If current limit is active, suspend the ramp, and resume the ramp when the current limit is exited, starting at the frequency at which the current limit left off.

1.3 Voltage Control

Having determined the desired motor frequency (w) by converting the N*cmd to frequency, the motor voltage Va*, Vb*, Vc* is calculated next. The premises in section 1.1 lead to the following simple motor control law in FIG. 6.

Figure 6:
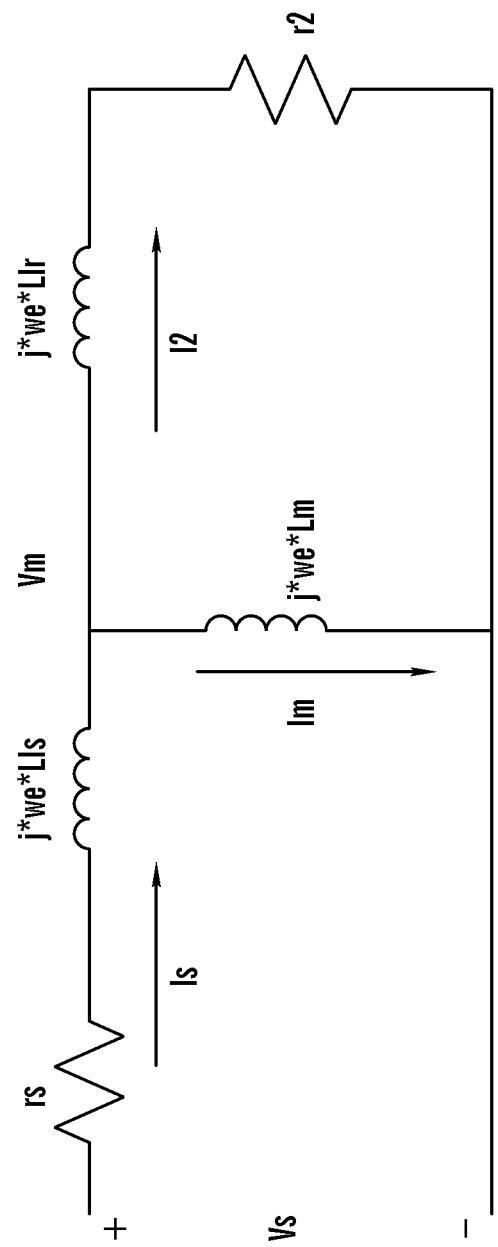
FIG. 6 illustrates a diagram in accordance with exemplary embodiments.

For FIG. 6, define:

$$Ids=Im \qquad \text{Equation 1}$$

$$Iqs=I2 \qquad \text{Equation 2}$$

in Amps peak (Apk).

Define the no load (magnetizing) current approximation in the stator voltage reference frame (Im) as Ids and the rotor current due to slip (I2) as Iqs. Therefore $$Idqs=Ids+j*Iqs \qquad \text{Equation 3}$$

The applied stator voltage is defined as:

$$Vdqs=Vds+j*Vqs \qquad \text{Equation 4}$$

Exemplary embodiments calculate the voltage vector components as:

$$Vqs=Im*w_e*Ls+Im*rs \qquad \text{Equation 5}$$

$$Vds=Iqs*rs-w_e*Lsp*Iqs \qquad \text{Equation 6}$$

Where $$Ls=Lm+\_Lls$$

$$Lr=Lm+Llr$$

$$Lsp=(Ls-Lm*Lm/Lr)$$

In Equation 5 the first term of Vqs is the common V/Hz term and the second is compensation for the stator resistance voltage drop from the magnetizing current. In Equation 6 the d-axis voltage decouples the vector currents. Note that in accordance with Equation 1, the equations use the ideal magnetization current Im rather than Ids, because the currents are not actually regulated. No dynamic current feedback occurs in the q-axis. This arrangement improves the stability of the control.

To establish the stator voltage reference frame the control 20 is configured to integrate the stator frequency we to obtain the stator reference frame angle θe, and perform the normal Clarke and Park transforms on the phase current feedback, the vector voltage output, and the phase voltage feedback. The compensations in Equations 5 and 6 make a difference in acceleration performance. For example, consider a profile of a hypothetical ramp up to 4000 rpm of the RAF motor with simple V/Hz control and no compensations (rs=0). In a simulation, the large overshoot in motor current is due to excess magnetization current under dynamic conditions. This overshoot is dependent on the acceleration rate, which was 1000 rpm/sec in this simulation.

When Equations 3, 4, 5, and 6 are applied, the current overshoot is less in this case. Note that Vqs is proportional to speed as suggested by Equation 5, while Vds is proportional to the load torque and current, as suggested by Equation 6.

As can be seen, section 1.3 illustrates why the compensations defined in this section are beneficial, because the RAF motor currents (Ia, Ib, Ic) can easily rise above the RFMC's 10 ratings without the compensation and the RAF motor currents, which would likely cause a fault. Another way to limit this current would be to carefully control the acceleration rate of the motor 105, and this may be considered inexact.

1.4 Voltage Regulation

The voltage control law of section 1.3 may require that the actual voltage output from the RFMC 10 be accurate with respect to the desired voltage, despite changes in the HVDC power source 15, and nonlinearities in the inverter 30. The requirement is especially acute at low voltages (corresponding to low speeds), where two or three volts of error can be significant in terms of the resulting motor current (Ia, Ib, Ic). For this reason, the RFMC concept as illustrated in FIG. 1 shows the use of output voltage feedback (blocks 215 and 220) to regulate the RFMC 10 output voltage Va*, Vb*, Vc*.

Figure 7:
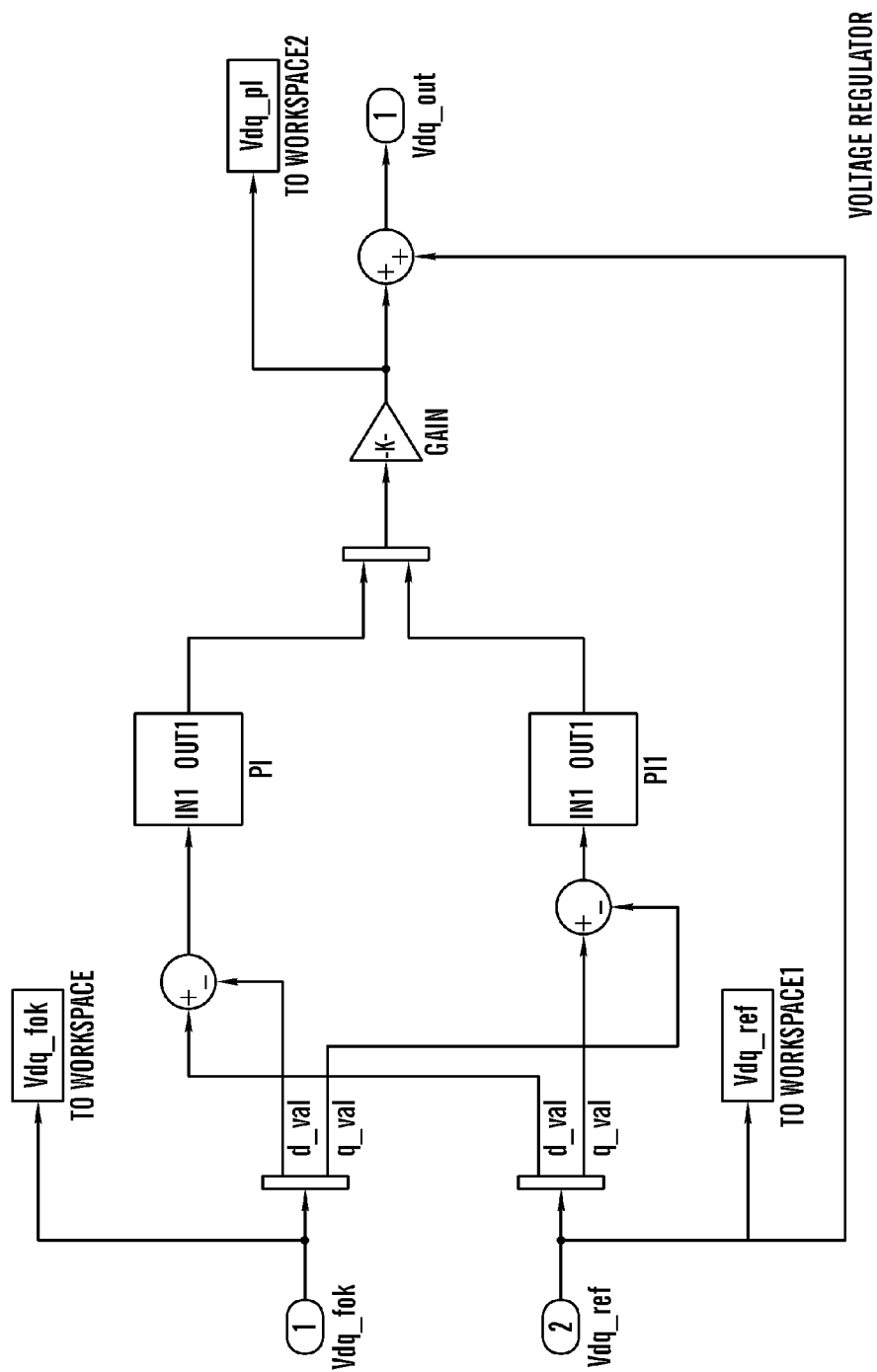
FIG. 7 illustrates a diagram in accordance with exemplary embodiments.

For accuracy of voltage production, the RFMC 10 uses a proportional and integrating regulator (PI) voltage regulator (implemented in block 230 of control 20), as further illustrated in FIG. 7. The reference for the voltage regulator is the required voltage vector, designated as Vdq_ref in FIG. 7, and described in block 230 (Vdq_ref is internal to block 230 to output Vdq_ref). The feedback for the voltage regulator in block 230 is designated as Vdq_fbk in FIG. 7, and described with reference to blocks 215, 220, and 230. The output of the voltage regulator (which is implemented in block 230) is the compensated voltage command, designated as Vdq_out in FIG. 7, and corresponding to V*dq in FIG. 2.

1.5 Current Limit

1.5.1 Concept

The premise is made that torque is approximately linear with slip speed, and approximately linear to the excess quadrature current (Iqs). This current Iqs can be limited, therefore, by controlling the motor frequency (w) and thus slip. In one implementation, exemplary embodiments are configured so that only Iqs can be controlled this way. Therefore, with frequency control, the control 20 can (only) really control the torque-producing current. Furthermore, magnetizing current will not be exactly constant under dynamic conditions in this implementation. However, the control 20 can indirectly control the total current by adjusting the current limit reference based on the measured magnetizing current (Ids). This section 1.5 expands on the general procedure.

Exemplary embodiments define the RFMC current limit as being equal to the vector magnitude of the measured motor current:

$$I^2limit=I^2ds+I^2qs \qquad \text{Equation 7}$$

Only Iqs can be controlled with frequency, so the control 20 can subtract the measured magnetizing current from Ilimit to obtain a q-axis current reference.

$$Iqs=Iqref=\text{sqrt}(I^2limit-I^2ds) \qquad \text{Equation 8}$$

If the measured Iqs exceeds Iqref, or $$Iqs>Iqref+Ihyst \qquad \text{Equation 9}$$

where $$Ihyst=\text{error hysteresis band}(Apk) \qquad \text{Equation 10}$$

Figure 8:
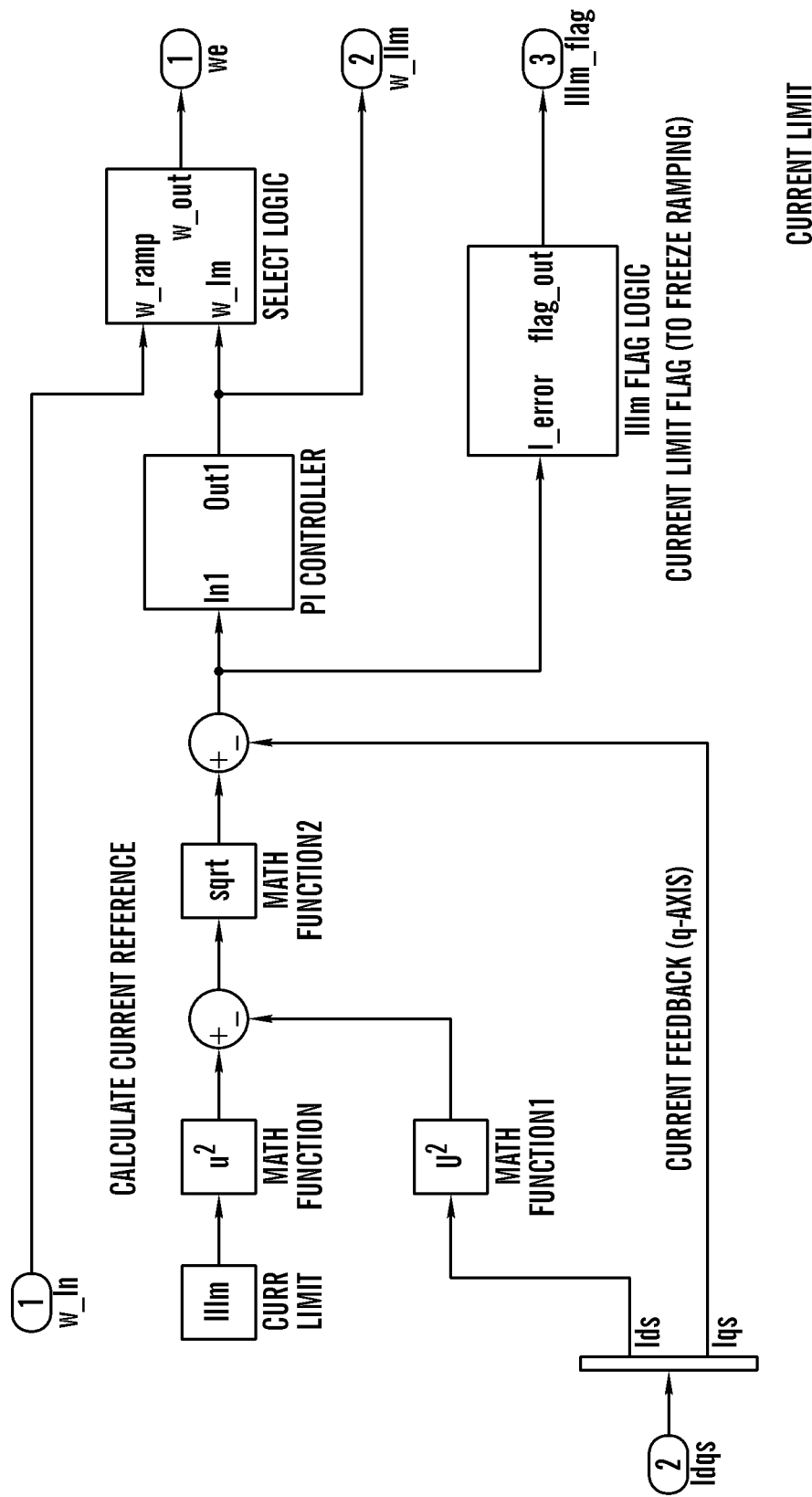
FIG. 8 illustrates a diagram in accordance with exemplary embodiments.

Then the control 20 can engage a PI controller which adjusts we so that the current equals Iqref. FIG. 8 illustrates this procedure in a current limit architecture in blocks 225 and blocks 230. The q-axis current reference Iqref as calculated in Equation 7 (for RFMC current limit) is summed with the current feedback in the q-axis in FIG. 8 to produce an error signal for the PI controller, which in turn produces a frequency w at which the inverter 30 is to run. This frequency w (in blocks 225 and 230) is substituted for that which is described for normally calculating frequency in the stator voltage in the background section, because the current limit overrides normal motor speed control (for a conventional polyphase induction motor) as described in blocks 205, 210, and 225 of FIG. 2.

In FIG. 8, current limit may be implemented as a mode (by the control 20) which is entered (only) when the current exceeds the limit, and exited when the current falls below the limit. The current limit thereby overrides the normal motor speed control (for a conventional polyphase induction motor) and the current limit is illustrated explained with reference to block 225 of FIG. 2. The current limit process is given in Table 2 below.

TABLE 2

Current Limit Process

1. If any of the entrance criteria are satisfied (e.g., in Table 3 below), enter current limit mode, stop ramping the frequency, and initialize the PI controller to start at the frequency at which the ramp was frozen.
2. Calculate the current limit reference Iqref according to Equation 8.
3. Calculate the current limit error, and run the PI controller.
4. If any of the exit criteria are satisfied (in Table 3), exit current limit mode, and transfer frequency control back to the ramp function beginning at the frequency where the current controller left it.

Next, Table 3 provides the current limit (positive) logic for FIG. 8.

TABLE 3

Current Limit (positive) Logic

Entrance Criteria:
a.) Iqs > Iqref + Ihyst (Equation 9)
PI controller upper limit: speed command (in rad/sec)
PI controller lower limit: 0
Exit Criteria:
a.) Iqref − Iqs > Ihyst
b.) speed command (rad/sec) < (wlim − wSlipNom)

To enter positive current limit, the q-axis current has to exceed the reference plus a hysteresis as specified in Equation 9. Once in current limit, the PI controller is constrained to frequencies between 0 and the speed command (in rad/sec).

The positive current limit reference must be greater than zero. One exit criterion requires that the error goes beyond the opposite end of the hysteresis band. This will happen if the load decreases, and the PI output increases to its positive limit, and saturates there (this is what allows the current limit controller to accelerate while in current limit). The other exit criterion allows the current limit to stop if the speed command is decreased below where the PI controller is operating. Without this condition, unless the load decreased, there may be no other way to escape current limit. With current limit control plus the vector voltage law discussed in section 1.3, motor acceleration can be accomplished within the limits of the RFMC 10.

1.5.2 Negative Current Limit

The current limit controller (of the control 20) can also be given a negative reference, and/or even zero. With the proper logic (e.g., in Table 4 below), the controller can prevent Iqs from going negative. Because the RFMC 10 has no dynamic brake (in this implementation), and cannot absorb energy in it's DC link (e.g., for receiving the 270 volts and 28 volts DC), the negative current limit is useful to prevent the DC link from rising and tripping the RFMC 10 if the RFMC 10 tries to decelerate too quickly. To illustrate this scenario, a simulation was run with the induction motor 105 decelerating from 6000 rpm to 5000 rpm, as quickly as possible. In the simulation, at 2.5 seconds, the speed command (N*cmd) is instantly changed to 5000 rpm. Since the controller 10 cannot develop negative torque, the controller 10 can only decelerate as fast as the load (which is the motor 105) will allow. During the simulation, the motor frequency is scaled to rpm. The motor frequency (w) converges on the actual speed between 1.5 and 2.5 seconds because the current limit controller is in limit because of a negative reference at zero. The load torque decelerates the motor 105 until the speed drops below 5000 rpm, at which point the speed is correct again. Note the Iqs current saturates at about 0 amps when the negative limit is encountered. In the simulation, when the motor 105 is decelerating in current limit, the motor current is approximately equal to the magnetizing current only. Once the reference speed is reached, the current rises as the motor picks up load again.

Below Table 4 illustrates current limit (negative) logic.

TABLE 4

Current Limit (negative) Logic

Entrance Criteria:
a.) Iqref_neg − Iqs > Ihyst
PI controller upper limit: spd_max
PI controller lower limit: speed command
Exit Criteria:
b.) Iqref_neg − Iqs > −Ihyst
c.) speed command (rad/sec) > (wlim + wSlipNom)

The entrance and exit criteria for the negative current limit in Table 4 are basically the reciprocals of those in Table 3. In negative current limit, the PI controller is constrained to frequencies between the speed command (in rad/sec) and the maximum speed (defined presently, e.g., as 9000 rpm for the RFMC 10). The negative current reference is a constant value which must be negative or zero, and is not calculated by Equation 9.

1.6 Stator Resistance Normalization

Inspection of the voltage laws in Equations 5 and 6 indicate that the voltage compensation terms which involve the stator resistance rs constitute positive feedback (i.e., more current results in more voltage). Although the terms are small, at very low frequency, where resistance dominates the motor impedance, the terms which involve the stator resistance rs can have a significant effect.

During a simulation, at the very start of acceleration, vector current Iq peaks before approaching the value consistent with the load profile. Likewise, the motor current peaks within the first cycle of operation. The peak level is dependent upon acceleration and in the simulation the peak level was 500 rpm/sec. If the current peak is high enough to cause the controller 10 to enter current limit at such a low frequency, the motor will most likely stall.

The compensations in Equations 5 and 6 produce higher low speed torque than by not using them. Since one of the features in the RFMC controller 10 is to conserve current, it is still desirable to have the motor current build up gradually until the motor speed is higher than the slip speed. The normalization function chosen for this purpose is the motor impedance angle. Specifically, the process chosen is to calculate $$\Theta m = a\tan(we*Lm)/rs \qquad \text{Equation 11}$$

and then normalize the resistance used for compensation by calculating $$MotorRsNorm = rs*(\Theta m)/(\pi/2) \qquad \text{Equation 12}$$

The voltage equation in Equations 5 and 6 can then be rewritten $$Vqs = Im*we*Lm + (Im*MotorRsNorm) \qquad \text{Equation 13}$$

$$Vds = Iqs*MotorRsNorm - (we*Lsp*Iqs) \qquad \text{Equation 14}$$

The normalization equation which is Equation 12 has the effect of making MotorRsNorm be zero at a motor frequency of zero, and approach the nominal value of for MotorRsNorm as the frequency increases to where the motor impedance becomes dominated by the magnetizing inductance.

The low speed characteristic of the acceleration profile is in MotorRsNorm. Note that in simulation Iq has a more gradual rise, and the phase current rise is more gradual in the first few cycles.

1.7 Spinning Motor Engagement

For transfers between the Common Motor Starter Controller (CMSC) which is a paralleled motor controller also capable of operating the RAM Fan Motor 105 and RFMC control 10, the RFMC 10 is required to engage the RAF or RAF motor 105 while the motor 105 is spinning. This process also requires good control of the motor flux and current. The state of the art baseline RAF designs include a speed sensor which will be used for tracking the motor speed. The speed sensor of the state of the art has a limited speed range.

However, in accordance with exemplary embodiments, the RFMC concept is a sensorless way of tracking the motor speed throughout the motor's 105 range, which is why FIG. 1 does not show a speed sensor. This section further describes the method. In exemplary embodiments, the engagement process will start at the maximum frequency which equates to the maximum motor speed of the motor 105.

The engagement process of the control 20 involves three phases: searching, tracking, and engaging. In the first phase of searching, the RFMC 10 determines the motor speed. In the second phase of tracking, the RFMC 10 follows the motor 105 speed (or frequency w) until the speed (frequency w) drops below the commanded speed which is N*cmd, and the RFMC 10 sets its output frequency w (in Va*, Vb*, Vc* to match the motor speed. In the third phase of engaging, the RFMC 10 ramps up its three phase output voltage Va*, Vb*, Vc*, and the RFMC 10 begins ramping up the frequency w of the output voltage until the frequency w reaches the equivalent of the commanded speed N*cmd. In FIG. 2, blocks 225 and 230 ramp up the frequency and voltage respectively.

Referring again to Table 1, if the motor 105 is running at its synchronous speed, there is by definition no load, and the (only) current will be the magnetizing current (i.e., Iqs will be zero). Since the motor speed is not initially known, the slip at any given frequency will not be known. In one implementation, model assumptions may only be valid within rated slip, beyond which exciting the motor 105 with nominal voltage could produce very large currents. The control 10, however, can excite the motor 105 with a small search voltage Vdq_search, which for example may be 10% of normal operational motor voltage (e.g., if the normal operational motor voltage is 100 volts, Vdl_search would be 10 volts). Vdq_search will result in currents equal to and/or less than the motor's rated magnetizing current, even if the slip is large. If the control 10 begins searching for the synchronous frequency by starting at the highest possible frequency value and proceeding downward while applying Vdq_search to the motor 105, the control 10 will monitor Iqs; Iqs will be positive and approach zero as the frequency w in Va*, Vb*, Vc* (of V sine wt) approaches the actual motor speed of the motor 105.

$$Vq\text{-search} = VdqCatchFact*Vqs \qquad \text{Equation 15}$$

$$Vd\text{-search} = VdqCatchFact*Vds \qquad \text{Equation 16}$$

In Equations 15 and 16, Vqs and Vds are defined by the normal voltage Equations 13 and 14. VdqCatchFact (a vector) is a constant which scales the normal voltage equations to a smaller value.

Figure 9:
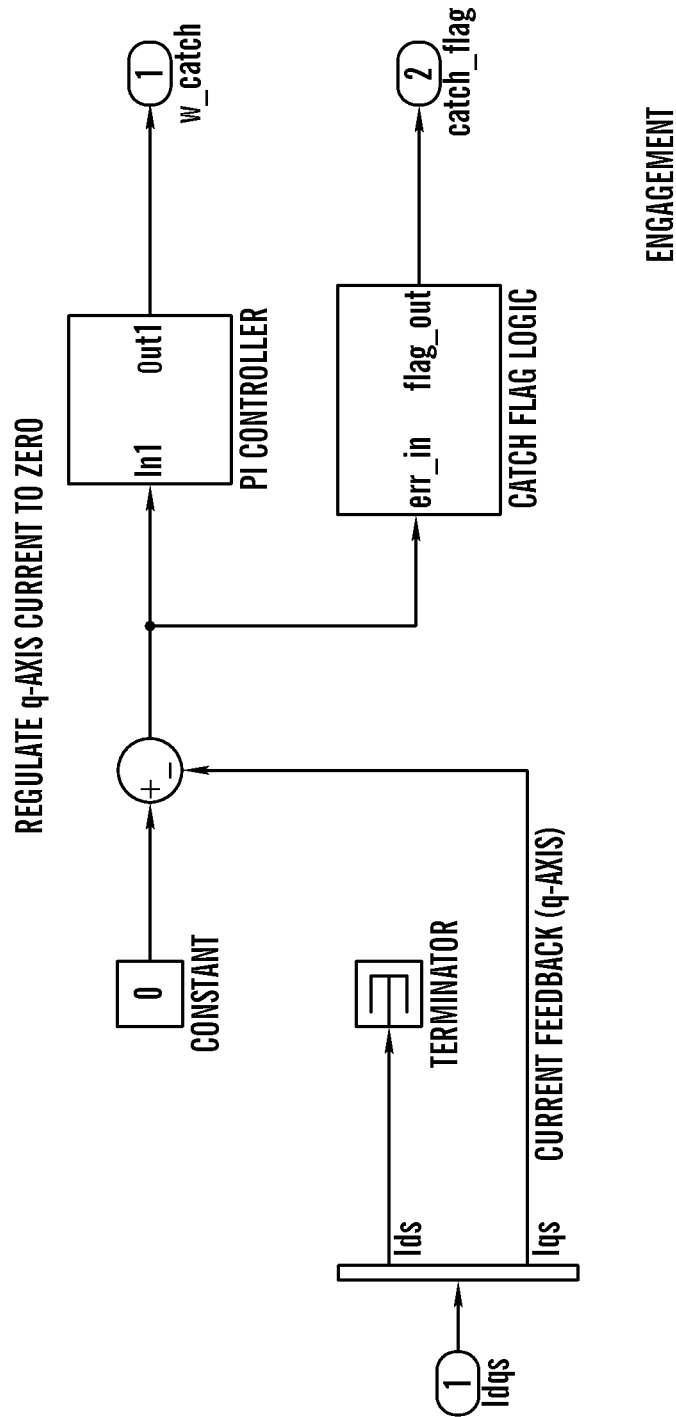
FIG. 9 illustrates a diagram in accordance with exemplary embodiments.

The engagement controller (of blocks 225 and 230) uses a PI controller on Iqs with a reference value of zero, which has frequency as its output, as depicted in FIG. 9. The PI controller is similar in all ways to that described in FIGS. 7 and 8, except for the values of its parameters. The block labeled "Catch Flag Logic" represents logical time-dependent conditions which determine if the engagement process can be terminated. Table 5 below illustrates the engagement process.

TABLE 5

| Engagement Process |
|---|
| 1) When a speed command (N*cmd) is received, enter "Catch" mode (i.e., search mode). |
| 2) Start the PI controller at the max motor frequency (e.g., 13500 rpm), and Vqds = Vqd-search (refer to Equations 15 and 16). |
| 3) Allow the PI controller to adjust the output frequency downward. |
| 4) When the control error is less than a threshold, start incrementing a timer. |
| 5) If the timer reaches a limit, and the equivalent frequency is less than the commanded speed, set the frequency ramp to the output frequency of the PI controller, exit "Catch" mode, and start ramping up to the reference frequency. |

Figure 10:
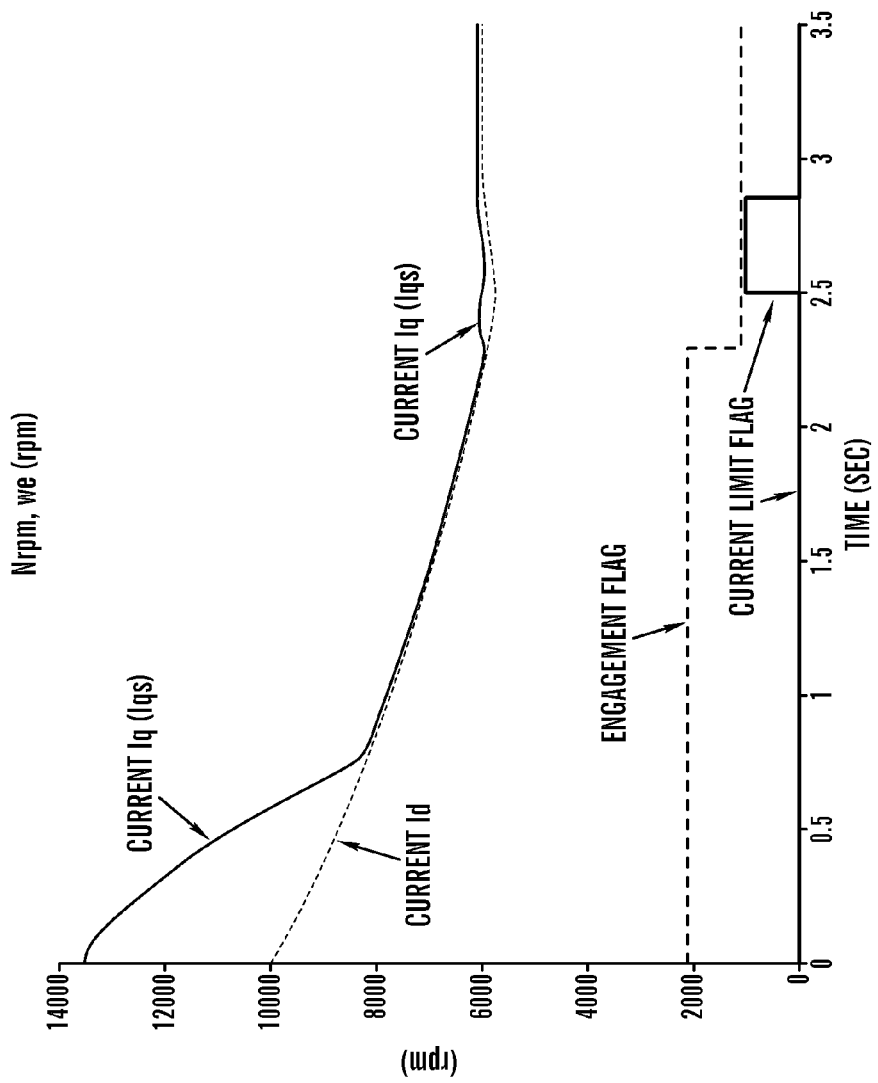
FIG. 10 illustrates a graph in accordance with exemplary embodiments.
Figure 11:
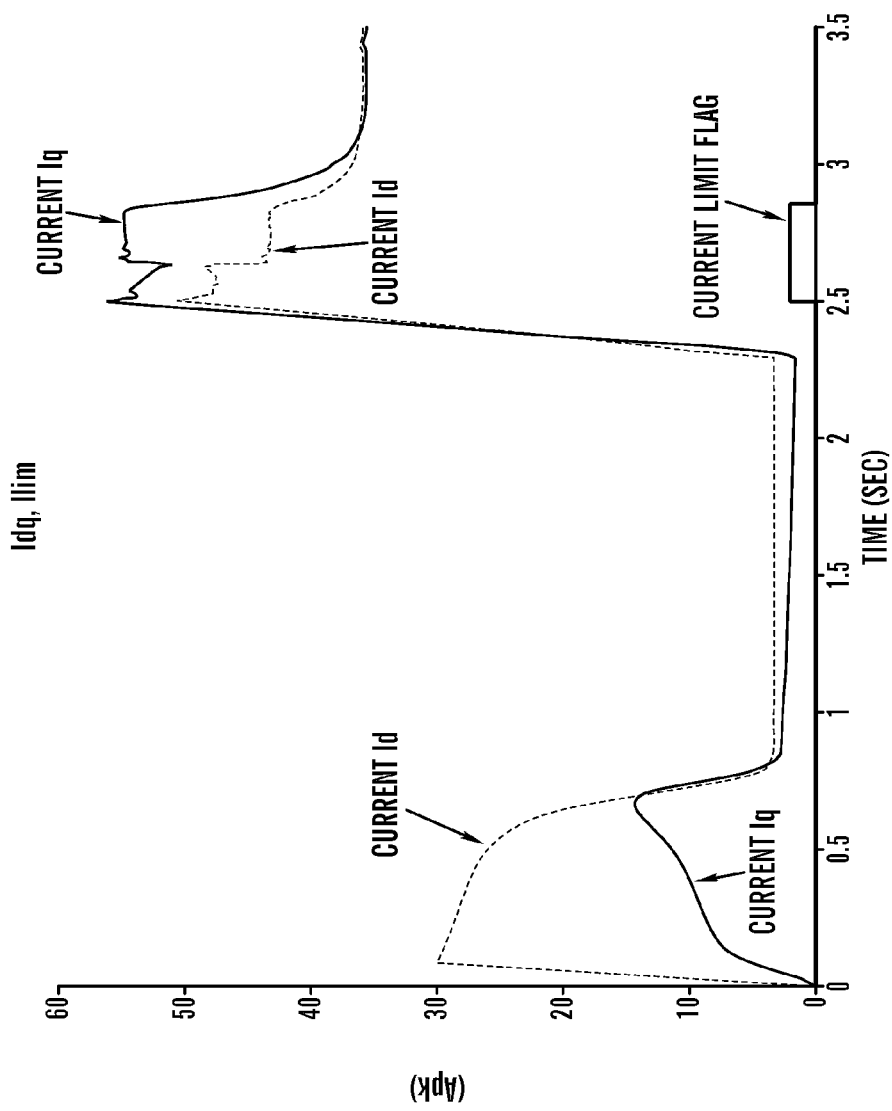
FIG. 11 illustrates a graph in accordance with exemplary embodiments.

FIGS. 10 and 11 describe the following simulated scenario which is provided for explanation purposes and not limitation. The control 20 of the RFMC 10 receives a command to command the RFMC to 6000 rpm with the motor speed (e.g., motor 105) initially at 10000 rpm. The threshold for the error was 4 Apk, and VdqSearchFact was 0.1 (i.e., 0.1 VdqSearchFact means 10% of normal voltage was applied). FIG. 10 is a graph depicting RFMC spinning motor engagement (sensorless). The control 20 processes currents Iq (Iqs) and Id, an engagement flag, and current limit flag.

In FIG. 10, the control 20 starts out in catch mode (also referred to as search mode) shown as Iq (Iqs). The tracking controller 10 PI output shown as Iq (Iqs) is initially set to a frequency equivalent to 13500 rpm. The control 20 immediately starts searching down (i.e., decreasing the frequency w in Va*, Vb*, Vc*), and converges on the actual motor speed shown as Id at about 0.7 sec. When the motor speed (Id) drops below 6000 rpm, catch mode is exited by the controller 20, and the frequency begins to ramp up again. Current limit in the graph is immediately encountered, after which the commanded frequency of N*cmd is reached. The bottom trace in FIG. 10 is called an engagement flag, which is communicated to the aircraft over the CAN bus, as described above. The engagement flag indicates to the aircraft that the current limit is active, and the motor controller 10 may, therefore, not be able to attain the commanded speed N*cmd.

FIG. 11 shows the vector currents. During the tracking phase, Iq is slightly greater than zero because of the steady state error. As a result, the tracking frequency of Iq will (always) be slightly greater than the actual motor synchronous speed related to Id. This is the desired situation for engaging the motor.

Figure 12:
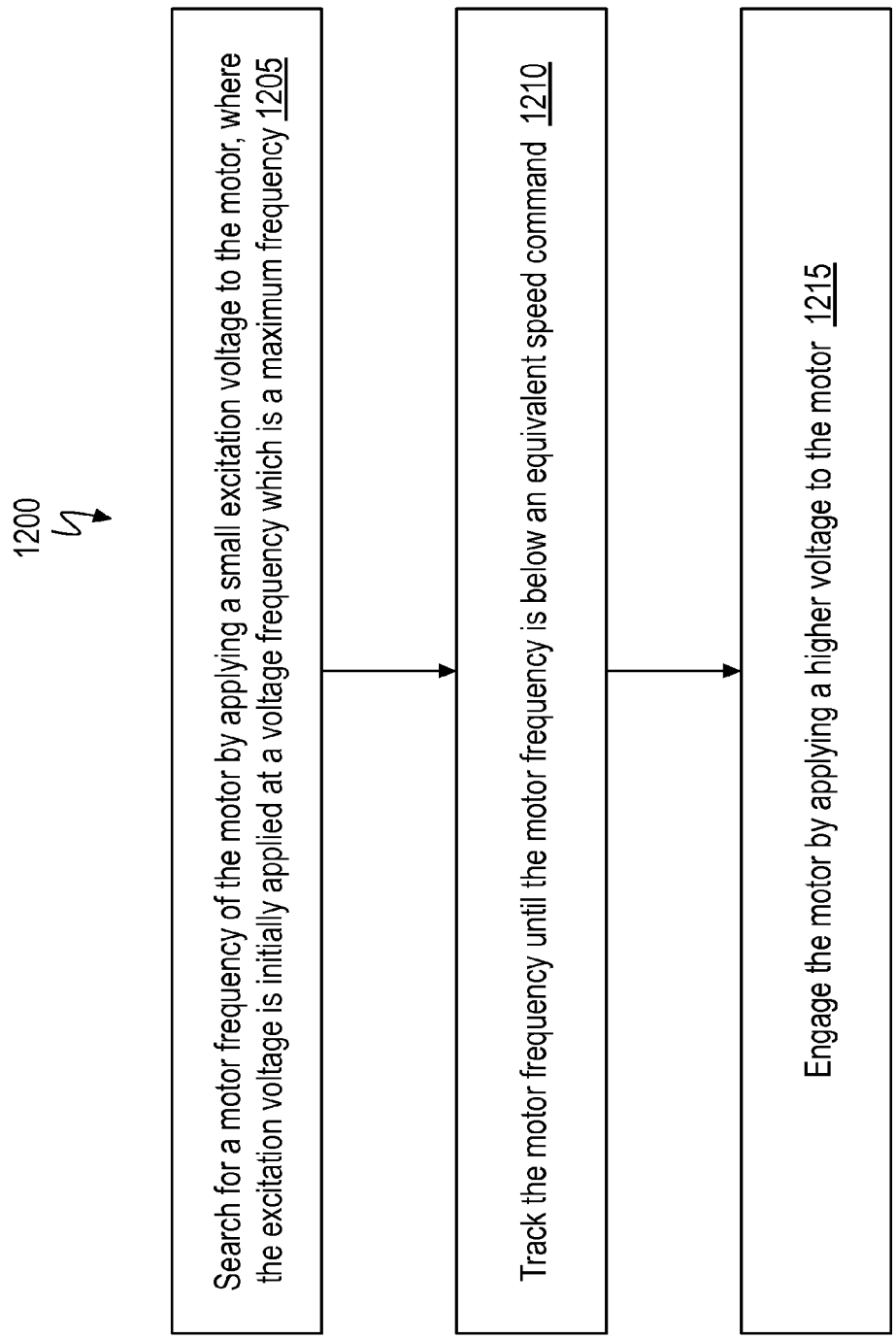
FIG. 12 illustrates a flow chart in accordance with exemplary embodiments.

FIG. 12 illustrates a flow chart 1200 for engaging a freely spinning motor 105 (without requiring a speed sensor and/or position sensor) in accordance with exemplary embodiments.

At operation 1205, the control 20 is configured to search for a motor frequency (w) of the motor 105 by applying a small excitation voltage to the motor 105, where the excitation voltage is initially applied at a voltage frequency (V sine wt) which is a maximum frequency. The maximum frequency may be the maximum frequency capacity that can be output by the motor controller 20 and/or the maximum frequency capacity of the motor 105. The control 20 causes the HVDC (power section) 15 to provide power to the motor 105.

At operation 1210, the control 20 is configured to track the motor frequency (w) until the motor frequency is below an equivalent speed command (such as N*cmd).

At operation 1215, the control 20 is configured to engage the motor 105 by applying a higher voltage to the motor 105.

Further, searching for the motor frequency of the motor by applying the small excitation voltage to the motor comprises the control 20 monitoring a feedback current (e.g., Ia, Ib, Ic and feedback voltages Va, Vb, Vc) of the motor 105 to determine the motor frequency. The control 20 (in blocks 205 and 210) is configured to transform the feedback current to a current vector (such as Iq and/or Iqs) that indicates the motor frequency (i.e., motor speed). The control 20 is configured to determine that when the feedback current (which is transformed to Iq) is zero the motor frequency (rpm of the motor) equals the voltage frequency (which is w in the V sine wt for Va*, Vb*, Vc*). The control 20 is configured to determine that when the feedback current Iq is approaching the zero, the motor frequency is approaching the voltage frequency. The control 20 is configured to determine that when the feedback current Iq is below zero, the motor frequency is below the voltage frequency. Tracking the motor frequency until the motor frequency is below the equivalent speed command (e.g., N*cmd) comprises the control 20 continuously reducing the voltage frequency until the voltage frequency is below the equivalent speed command, where the voltage frequency is according to how the motor frequency is reduced (i.e., according to how the speed of the motor decreases) which is indicated by the feedback current Iq. When the feedback current reaches zero and when the voltage frequency is reduced, the control 20 is configured to determine that the voltage frequency presently applied correlates to a motor speed of the motor below the equivalent motor speed command N*cmd. Engaging the motor by applying the higher voltage to the motor comprises the control increasing the voltage frequency until the voltage frequency reaches the equivalent of the speed command and the control increasing the amplitude of the voltage Va*, Vb*, Vc* applied to the motor 105 from the excitation voltage to the higher voltage. The higher voltage is the voltage amplitude needed to ramp up the motor to the desired speed.

The control 20 is configured to search for the motor frequency of the motor by applying the small excitation voltage to the motor 105 such that a large current will not be drawn from the motor controller 20 when the motor 105 is freely spinning The larger current is caused by applying the higher voltage when the motor speed is freely spinning greater than the capacity of the motor controller 20.

To determine a motor speed of the motor 105, the control 20 is configured to transform a feedback current of the motor into a current vector, in which the current vector (Iq) equates to the motor frequency of the motor. Also, the control 20 is configured to apply the voltage frequency to the motor 105 such that the control 20 correlates the voltage frequency to a particular speed. When the feedback current is zero, the control 20 is configured to determine that the motor 105 is spinning at the motor speed of that particular speed.

The various processes, methods, operations, and/or steps in Tables described herein may be implemented by the control 20, which is also referred to as the special purpose computer having software applications 45.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A motor controller for engaging a spinning motor, comprising:
    a power section configured to provide power to the motor; and
    a control configured to control the power section, wherein the control is configured to:
        search for a motor frequency of the motor by applying a small excitation voltage to the motor, wherein the excitation voltage is initially applied at a voltage frequency which is a maximum frequency;
        track the motor frequency until the motor frequency is below an equivalent speed command; and engage the motor by applying a higher voltage to the motor, wherein to determine a motor speed of the motor:
the control is configured to transform a feedback current of the motor into a current vector, in which the current vector equates to the motor frequency of the motor;
the control is configured to apply the voltage frequency to the motor, in which the control correlates the voltage frequency to a particular speed; and
when the feedback current is zero, the control is configured to determine that the motor is spinning at the motor speed of the particular speed.

2. The motor controller of claim 1, wherein the control is configured to determine that when the feedback current is zero the motor frequency equals the voltage frequency.

3. The motor controller of claim 1, wherein the control is configured to determine that when the feedback current is approaching the zero, the motor frequency is approaching the voltage frequency.

4. The motor controller of claim 1, wherein the control is configured to determine that when the feedback current is below zero, the motor frequency is below the voltage frequency.

5. The motor controller of claim 2, wherein track the motor frequency until the motor frequency is below the equivalent speed command comprises the control continuously reducing the voltage frequency until the voltage frequency is below the equivalent speed command, wherein the voltage frequency is reduced based on the control monitoring that the motor frequency is reducing as indicated by the feedback current; and
wherein when the feedback current reaches zero and when the voltage frequency is reduced, the control is configured to determine that the voltage frequency presently applied correlates to a motor speed of the motor below the equivalent speed command.

6. The motor controller of claim 5, wherein engage the motor by applying the higher voltage to the motor comprises:
the control increasing the voltage frequency until the voltage frequency reaches the equivalent speed command; and
the control increasing a voltage applied to the motor from the excitation voltage to the higher voltage.

7. A method for a motor controller engaging a spinning motor, comprising:
searching for a motor frequency of the motor by applying a small excitation voltage to the motor, wherein the excitation voltage is initially applied at a voltage frequency which is a maximum frequency;
tracking the motor frequency until the motor frequency is below an equivalent speed command;
engaging the motor by applying a higher voltage to the motor; and
determining a motor speed of the motor by:
transforming a feedback current of the motor into a current vector, in which the current vector equates to the motor frequency of the motor;
applying the voltage frequency to the motor and correlating the voltage frequency to a particular speed; and
when the feedback current is zero, determining that the motor is spinning at the motor speed of the particular speed.

8. The method of claim 7, further comprising determining that when the feedback current is zero the motor frequency equals the voltage frequency.

9. The method claim 7, further comprising determining that when the feedback current is approaching the zero, the motor frequency is approaching the voltage frequency.

10. The method of claim 7, further comprising determining that when the feedback current is below zero, the motor frequency is below the voltage frequency.

11. The method of claim 8, further comprising tracking the motor frequency until the motor frequency is below the equivalent speed command comprises continuously reducing the voltage frequency until the voltage frequency is below the equivalent speed command, wherein the voltage frequency is reduced based on tracking that the motor frequency is reducing as indicated by the feedback current; and
when the feedback current reaches zero and when the voltage frequency is reduced, determining that the voltage frequency presently applied correlates to a motor speed of the motor below the equivalent speed command.

12. The method of claim 11, wherein engaging the motor by applying the higher voltage to the motor comprises:
increasing the voltage frequency until the voltage frequency reaches the equivalent speed command; and
increasing a voltage applied to the motor from the excitation voltage to the higher voltage.

13. A computer program product for a method for a motor controller engaging a spinning motor, the computer program product comprising:
a computer readable storage medium having computer readable program code embodied therewith for causing a computer to implement the method, the computer readable program code comprising:
searching for a motor frequency of the motor by applying a small excitation voltage to the motor, wherein the excitation voltage is initially applied at a voltage frequency which is a maximum frequency;
tracking the motor frequency until the motor frequency is below an equivalent speed command;
engaging the motor by applying a higher voltage to the motor; and
determining a motor speed of the motor by:
transforming a feedback current of the motor into a current vector, in which the current vector equates to the motor frequency of the motor;
applying the voltage frequency to the motor and correlating the voltage frequency to a particular speed; and
when the feedback current is zero, determining that the motor is spinning at the motor speed of the particular speed.

* * * * *